March 28, 1967 R. J. WEEKS 3,311,744
LIGHT ASSEMBLY
Filed Aug. 6, 1964

INVENTOR
RICHARD J. WEEKS
BY
Dick & Zarley
ATTORNEYS

United States Patent Office 3,311,744
Patented Mar. 28, 1967

3,311,744
LIGHT ASSEMBLY
Richard J. Weeks, 6210 Northwest Drive,
Des Moines, Iowa 50322
Filed Aug. 6, 1964, Ser. No. 387,971
6 Claims. (Cl. 240—51.11)

This invention relates to a light assembly and in particular to a light assembly which may readily be orientated into various positions of use.

It is one of the primary objects of this invention to provide a light assembly having essentially two parts, a base member for carrying the electrical controls and light means and a sheet member extending over the base member serving as a shade for the light and a cover for the electrical components as well as a support means for the light assembly.

A related object of this invention is to provide a light assembly having a continuous sheet member which is V-shape in cross-section and adapted to be mounted in mating engagement with adjacent walls forming a corner.

A still further object of this invention is to provide a light assembly having a continuous sheet member formed with openings in its ends for receiving hanger means extending from the frame of a light means wherein the light means is positioned between the leg portions of the sheet member.

A still further object of this invention is to provide a light assembly having an electrical lead with means for detachable engagement with a second electrical lead which in turn may be connected to an electrical power source.

A still further object of this invention is to provide a light assembly having a continuous sheet member which is V-shaped in cross-section and is adapted to serve as a lamp shade for a light means secured thereto and the sheet member may be mounted on its end on a supporting surface. If desired, clip means may be provided on the supporting surface for releasable engagement with the leg portions of the sheet member.

A still further object of this invention is to provide a light assembly which may be operated from a D.C. electrical battery power supply and thus be capable of use with automobiles and camping equipment.

A still further object of this invention is to provide a light assembly which is transistorized and operated off of a D.C. power supply.

A further object of this invention is to provide a light assembly which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

Figure 11:
Figure 12:
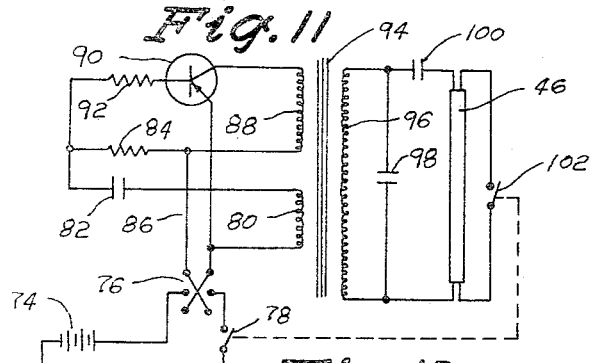

FIG. 11 is a perspective view of the lead lines extending from the light assembly positioned for engagement with a second pair of lead lines having a female socket member and a male member for connection with an electric power supply such as the cigarette lighter socket in an automobile or the like; and FIG. 12 is a schematic drawing of the electrical wiring for the light assembly of this invention.

Figure 1:
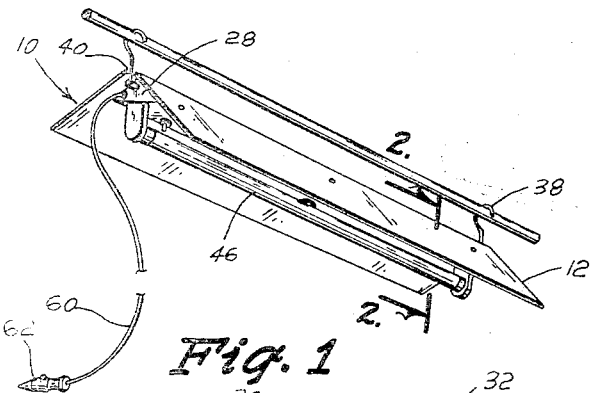
FIG. 1 is a persepctive view of the light assembly of this invention supported in a horizontal position by hanger means at opposite ends of the light assembly.
Figure 2:
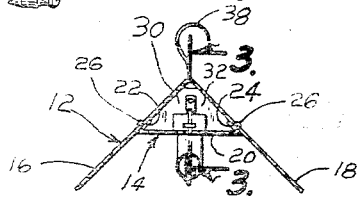
FIG. 2 is an elevation cross-sectional view taken along line 2—2 in FIG. 1 showing the relationship of the light means frame to the shade covering sheet member.

The light assembly of this invention is referred to generally in FIG. 1 by the reference numeral 10 and is shown to include essentially two major components in FIG. 2. First there is a continuous sheet member 12 which is V-shaped in cross-section and a light frame means 14 secured thereto. The sheet member 12 may be formed of plastic material and is generally formed with leg portions 16 and 18 extending outwardly with a 90° angle therebetween. This facilitates mounting the leg portions 16 and 18 in direct contact with the walls of a room or the like which meet at a corner at a right angle.

The frame 14 includes a base plate 20 with upwardly and inwardly extending side flanges 22 and 24. The side flanges extend at an angle relative to each other corresponding to the angle between the leg portions 16 and 18 of the sheet member 12. Screw means 26 or the like may be used to connect the flanges 22 and 24 to the leg portions 16 and 18.

Formed integrally with the metal plate 20 are triangular shaped end portions 28 and 30 which matingly engage the inner surfaces of the legs 16 and 18 of the sheet member 12. Thus, an elongated chamber 32 is formed between the leg portions 16 and 18, the base plate 20 and the end portions 28 and 30.

Figure 3:
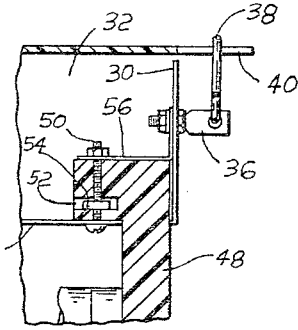
FIG. 3 is a fragmentary elevation view taken along line 3—3 in FIG. 2 showing in particular the connection of the hanger means to the light means frame and the fluorescent light end mounts connected to the frame.

A plate element 36 is bolted to each of the end portions 28 and 30 and extends parallel to the longitudinal axis of the light assembly 10 as illustrated in FIG. 3. A wire or rod hanger 38 is pivotally connected to the plate element 36 and is adapted to be positioned in an upwardly extending direction where it is received in a slot 40 extending inwardly from each end of the sheet member 12 along the vertex of the leg portions 16 and 18. When the hangers 38 are not in use they may hang freely downwardly from the plate elements 36 between the leg portions 16 and 18 of the sheet member 12.

Figure 9:
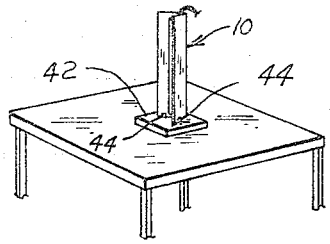
FIG. 9 is a perspective view of the light assembly mounted in a vertical position and being supported on its lower end by a support stand engaging the lower edges of the continuous sheet member.

The plate elements 36 are inwardly offset from the outer end edges of the sheet member leg portions 16 and 18 sufficiently to permit the leg portion edges to supportingly engage a table stand 42 as illustrated in FIG. 9.

It is to be appreciated also that the extension of the sheet member 12 longitudinally outwardly of the frame 14 and the plate elements 36 provides a cover and shielding means for the entire frame assembly.

Figure 10:
FIG. 10 is a fragmentary perspective view of a clip means mounted on the table support stand of FIG. 9 which releasably engages the leg portions of the continuous sheet member of the light assembly.

Referring again to FIG. 9 and also to FIG. 10 it is seen that the support stand 42 is provided with a pair of spring clips 44 adapted to releasably engage the lower edges of the leg portions 16 and 18 to more positively hold the lamp assembly 10 in a vertical position.

Referring now to FIGS. 1, 2 and 3 it is seen that a fluorescent light 46 extends the length of the frame 14 and is connected thereto by mounting members 48 which are secured within the chamber 32 and extend outwardly thereof away from the sheet member 12. It is seen in FIG. 2 that the fluorescent light 46 is positioned in a plane extending through the center of the base plate 20 and the vertex of the sheet member 12. The mounting members 48 are secured to the base plate 20 by a bolt assembly 50 which extends through the plate 20 and the inner end of the mounting member 48. A slot 52 is formed in the inner end of the member 48 in alignment with the hole for receiving the bolt assembly 50. A nut 54 is mounted on the bolt assembly 50 in the slot 52 and serves to clamp the member 48 to the plate 20. Also an L-shaped plate 56 is clamped by the bolt assembly to the upper end thereof and extends to the adjacent end portions 28 and 30 where it is connected thereto by the plate element 36 as illustrated in FIG. 3.

As illustrated in FIG. 2 particularly, it is to be appreciated that the transverse length of the leg portions 16 and 18 of the sheet member 12 are such that their outer longitudinal edges will extend into a common plane which is disposed outwardly from the vertex of the sheet member 12 a greater distance than the outermost portion of the frame 14 and the fluorescent light 46. This enables the light assembly 10 to be placed on a supporting surface with the longitudinal edges of the leg portions 16 and 18 supporting the light assembly and maintaining the fluorescent light 46 in a position spaced above the supporting surface.

An electrical lead 60 extends from the chamber 32 and is provided on its outer end with a male plug member 62 for insertion into the female socket member 64 connected to one end of a second lead line 66. The second lead line 66 as shown in FIG. 11 is provided with a male plug member 68 at its other end for releasable connection to the socket member in a cigarette lighter or the like of an automobile.

Figure 4:
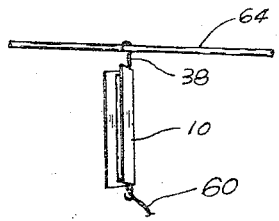
FIG. 4 is an elevational view showing the light assembly being held in a vertical position by hanger means extending from one end thereof engaging a support member.
Figure 5:
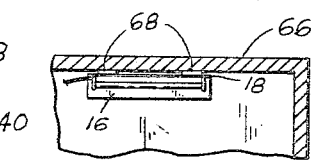
FIG. 5 illustrates a second manner for securing the light assembly in a horizontal position by providing means directly engaging one leg of the V-shaped continuous sheet member and the supporting ceiling wall.
Figure 7:
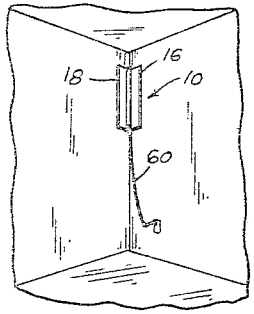
FIG. 7 is a fragmentary elevational view of a room or the like wherein the light assembly is positioned vertically in a corner with the side walls of the sheet member in mating engagement with the room side walls forming the corner.
Figure 8:
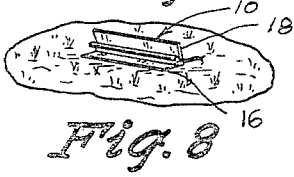
FIG. 8 illustrates the light assembly being supported directly by one side wall of the continuous sheet member bearing directly on the ground.
Figure 6:
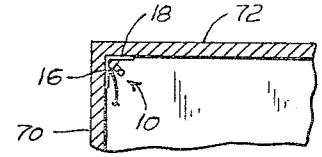
FIG. 6 is a third method of securing the light assembly in a horizontal position wherein the legs of the continuous sheet member are in mating engagement with the legs of the walls forming a corner.

The uses for the light assembly 10 are unlimited and are illustrated in a limited number by FIGS. 1, 4, 5, 6, 7 and 9. In FIG. 4, only one of the hanger elements 38 is used to support the light assembly 10 from a support rod 64. This positions the lamp 10 in a vertical position as may be sometimes desirable. In FIG. 5 it is seen that the leg portion 18 of the sheet member 12 is connected to a wall 66 by a pair of connecting elements 68. The connecting elements 68 may be of the magnetic type wherein they are secured by adhesive or the like to the plastic leg 18 and are magnetically attracted to the wall 66. In FIG. 6, the lamp assembly 10 is positioned in a horizontal plane but its leg portions of the sheet member 12 are in mating engagement with the walls 70 and 72. In FIG. 8 the lamp assembly 10 is shown laying on the ground being supported by a leg portion of the sheet member 12.

Referring now to the electrical schematic drawing of FIG. 12 it is seen that a D.C. battery power supply 74 is used which may be located on the automobile or in a camping type trailer or the like. The battery 74 is then connected to a polarity reversing switch 76 and also to an on-off switch 78. From the reversing switch 76 an electrical connection is made to a 20 turn transformer coil 80 which in turn is connected to a 10 mfd. capacitor 82 which in turn is connected to a 330 ohm 2 watt resistor 84 which is coupled to the other lead 86 of the reversing switch 76 and is also coupled to one end of a second transformer coil 88 of 40 turns. The coil 88 is in turn connected at its other end to a transistor 90 (2N441) which is in turn connected to a 27 ohm, ½ watt resistor 92. A ferrite core 94 is provided between the coils 80 and 88 and a secondary transformer coil 96. A capacitor 98 of 0.005 mfd. extends across the terminals of the coil 96. A capacitor 100 of 0.2 mfd. is provided in a electrical lead line extending from one end of the coil 96 to the fluorescent bulb 46. A starting switch 102 is connected between opposite ends of the fluorescent bulb 46 and is actuated by the on-off switch 78.

Thus it is seen, that an extremely versatile light assembly of extremely simple construction using a minimum number of parts has been provided which will operate off of D.C. power and employs the most modern electrical circuitry including the use of transistors.

Some changes may be made in the construction and arrangement of my light assembly without departing from the real spirit and purpose of my invention, and it is my intention to cover by my claims, any modified forms of structure or use of mechanical equivalents which may be reasonably included within their scope.

I claim:
1. A light assembly, comprising,
   a unitary elongated sheet member formed into two elongated portions, said portions having an angle therebetween of less than 180 degrees,
   an elongated lamp frame having a transverse cross-section shape corresponding to the space between said portions,
   means for securing said frame to said sheet member between and in mating engagement with said portions,
   light means secured to said frame on the opposite side of said frame from said sheet member,
   said sheet material having a greater length than said lamp frame and said lamp frame being centered between the ends of said sheet member,
   said sheet member having inwardly extending slots formed along a line of intersection of said portions,
   hanger means connected to each end of said frame and extending through said slots for engagement with a supporting surface on the opposite side of said sheet material from said frame, and
   said hanger means are further defined as being pivotally connected to said frame and said hanger means adapted to pivot from a position extending through said slots in said sheet member to a position extending between said portions on the side of said frame whereby said light assembly may be supported in a vertical position with one of said hanger means extending outwardly of said frame parallel to the longitudinal axis of said light assembly for said one hanger means to engage to a supporting means.

2. A light assembly, comprising,
   a unitary elongated sheet member V-shaped in cross-section forming a pair of leg portions, said leg portions having a substantially 90 degree angle therebetween whereby said sheet member is adapted to be positioned in a corner between two walls extending at right angles to each other,
   an elongated lamp frame having a flat base portion and triangular shaped end portions for matingly engaging the inside surfaces of said sheet member, said base portion, end portions and the leg portions of said sheet member serving to define an elongated chamber,
   electrical control means disposed in said chamber and secured to said base portion,
   a light means secured to the outer surface of said base portion,
   said leg portions of said sheet member having sufficient length transversely of the longitudinal axis of said sheet member to shield said lamp means, and said end portions on said frame are inwardly offset from the adjacent ends of said sheet member, and a support member is provided having a yieldable upstanding clip means secured thereon in engagement with one end of each of said leg portions.

3. A light assembly, comprising,
a unitary elongated sheet member V-shaped in cross-section forming a pair of leg portions, said leg portions having a substantially 90 degree angle therebetween whereby said sheet member is adapted to be positioned in a corner between two walls extending at right angles to each other,
an elongated lamp frame having a flat base portion and triangular shaped end portions for matingly engaging the inside surfaces of said sheet member, said base portion, end portions and the leg portions of said sheet member serving to define an elongated chamber,
electrical control means disposed in said chamber and secured to said base portion,
a light means secured to the outer surface of said base portion,
said leg portions of said sheet member having sufficient length transversely of the longitudinal axis of said sheet member to shield said lamp means, and
said end portions on said frame are inwardly offset from the adjacent ends of said sheet member, and said sheet member is formed with a slot extending inwardly from each end thereof along the vertex of said V-shaped member, and a hanger means is pivotally connected to each end portion of said frame, said slots extending adjacent said end portions to receive said hanger means, said hanger means extending outwardly of said sheet member on the opposite side thereof from said frame, said hanger means adapted to pivot to a position on the same side of said sheet member as said frame.

4. A light assembly, comprising,
a unitary elongated sheet member V-shaped in cross-section forming a pair of leg portions, said leg portions having a substantially 90° angle therebetween whereby said sheet member is adapted to be positioned in a corner between two walls extending at right angles to each other,
an elongated lamp frame having a flat base portion and triangular shaped end portions for matingly engaging the inside surfaces of said sheet member, said base portion, end portions and the leg portions of said sheet member serving to define an elongated chamber,
said end portions being inwardly offset from the adjacent ends of said sheet member,
an arcuately shaped hook-type hanger means pivotally connected to said frame and adapted to pivot upwardly for engagement with a supporting surface on the opposite side of said sheet member from said frame, and downwardly to a position on the same side of said sheet member as said frame,
electrical control means disposed in said chamber and secured to said base portion,
a light means secured to the outer surface of said base portion,
said leg portions of said sheet member having sufficient length transversely of the longitudinal axis of said sheet member to shield said lamp means, and
a support member is provided having a yieldable upstanding clip means thereon in engagement with one end of each of said leg portions.

5. A light assembly, comprising,
a unitary elongated sheet member V-shaped cross-section forming a pair of leg portions, said leg portions having a substantially 90° angle therebetween whereby said sheet member is adapted to be positioned in a corner between two walls extending at right angles to each other,
an elongated lamp frame having a flat base portion and triangular shaped end portions for matingly engaging the inside surfaces of said sheet member, said base portion, end portions and the leg portions of said sheet member serving to define an elongated chamber,
said end portions being inwardly offset from the adjacent ends of said sheet member,
an arcuately shaped hook-type hanger means pivotally connected to said frame and adapted to pivot upwardly for engagement with a supporting surface on the opposite side of said sheet member from said frame, and downwardly to a position on the same side of said sheet member as said frame,
electrical control means disposed in said chamber and secured to said base portion,
a light means secured to the outer surface of said base portion,
said leg portions of said sheet member having sufficient length transversely of the longitudinal axis of said sheet member to shield said lamp means,
said sheet member being formed with a slot extending inwardly from each end thereof along the vertex of said V-shaped member, said slots extending adjacent said end portions to receive said hanger means.

6. A portable light assembly, comprising,
a unitary elongated plastic sheet member formed into elongated portions, said portions having an angle therebetween of less than 180°, the end portions of said sheet member being substantially open and free from covering,
an elongated lamp frame having a transverse cross-sectional shape corresponding to the space between said portions,
a securing means for securing said frame to said sheet member between and in mating engagement with said portions, the lowermost edges of said portions extending below the bottom of said lamp frame,
a light means secured to said frame on the opposite side of said frame from said sheet member,
a hanger means pivotally connected to each end of said frame and adapted to pivot upwardly for engagement with a supporting surface on the opposite side of said sheet material from said frame, and
a support member having a yieldable upstanding clip means secured thereon in engagement with one end of each of said leg portions.

References Cited by the Examiner
UNITED STATES PATENTS

| | | | |
|---|---|---|---|
| 2,376,801 | 5/1945 | Mitchell | 240—51.11 |
| 2,381,450 | 8/1945 | Hrabak | 240—51.11 |
| 2,413,666 | 12/1946 | Tuck et al. | 240—51.11 |
| 2,536,355 | 1/1951 | Cox | 240—8.18 X |
| 2,810,823 | 10/1957 | Guth | 240—51.11 |
| 3,104,832 | 9/1963 | Ford | 240—53 |

NORTON ANSHER, *Primary Examiner.*

C. R. RHODES, C. B. PRICE, *Assistant Examiners.*